United States Patent
Alonso Tabares

(10) Patent No.: US 10,386,475 B2
(45) Date of Patent: Aug. 20, 2019

(54) METHOD OF DETECTING COLLISIONS ON AN AIRPORT INSTALLATION AND DEVICE FOR ITS IMPLEMENTATION

(71) Applicant: Airbus SAS, Blagnac (FR)

(72) Inventor: Diego Alonso Tabares, Toulouse (FR)

(73) Assignee: AIRBUS SAS, Blagnac (FR)

( * ) Notice: Subject to any disclaimer, the term of this patent is extended or adjusted under 35 U.S.C. 154(b) by 395 days.

(21) Appl. No.: 15/357,180

(22) Filed: Nov. 21, 2016

(65) Prior Publication Data

US 2017/0146649 A1    May 25, 2017

(30) Foreign Application Priority Data

Nov. 25, 2015 (FR) ..................... 15 61366

(51) Int. Cl.
| | |
|---|---|
| G08G 5/00 | (2006.01) |
| G01S 13/82 | (2006.01) |
| G01S 13/75 | (2006.01) |
| G01S 13/87 | (2006.01) |
| G01S 13/91 | (2006.01) |
| H04L 12/26 | (2006.01) |
| G08G 5/04 | (2006.01) |
| G08G 5/06 | (2006.01) |

(52) U.S. Cl.
CPC .......... *G01S 13/825* (2013.01); *G01S 13/751* (2013.01); *G01S 13/878* (2013.01); *G01S 13/91* (2013.01); *G08G 5/0013* (2013.01); *G08G 5/045* (2013.01); *G08G 5/065* (2013.01); *H04L 43/106* (2013.01); *H04L 43/16* (2013.01); *G01S 2013/916* (2013.01)

(58) Field of Classification Search
CPC .... G01S 13/751; G01S 13/825; G01S 13/878; G08G 5/065; H04L 43/16; H04L 13/106
USPC ........................................................... 342/455
See application file for complete search history.

(56) References Cited

U.S. PATENT DOCUMENTS

| | | | |
|---|---|---|---|
| 5,629,691 | A | 5/1997 | Jain |
| 7,903,023 | B2 | 3/2011 | Cornic et al. |
| 2009/0150013 | A1 | 6/2009 | Finn et al. |
| 2010/0109936 | A1 | 5/2010 | Levy |
| 2010/0194622 | A1 | 8/2010 | CLingman et al. |

OTHER PUBLICATIONS

French Search Report, dated Jul. 13, 2016, priority document.

*Primary Examiner* — Dao L Phan
(74) *Attorney, Agent, or Firm* — Greer, Burns & Crain, Ltd.

(57) ABSTRACT

A method of detecting collisions between an equipped mobile object travelling around an airport installation and at least one obstacle. The method comprises the following steps. Determining the real-time positions of the equipped mobile object in a reference frame tied to the airport installation. Reading at least one item of information contained in at least one marker fixed to the equipped mobile object. Determining an outline of the equipped mobile object on the basis of the read item of information contained in the marker. Positioning the outline determined in the reference frame tied to the airport installation. Triggering an alert if the distance between the outline of the equipped mobile object and the obstacle is less than a given threshold.

15 Claims, 3 Drawing Sheets

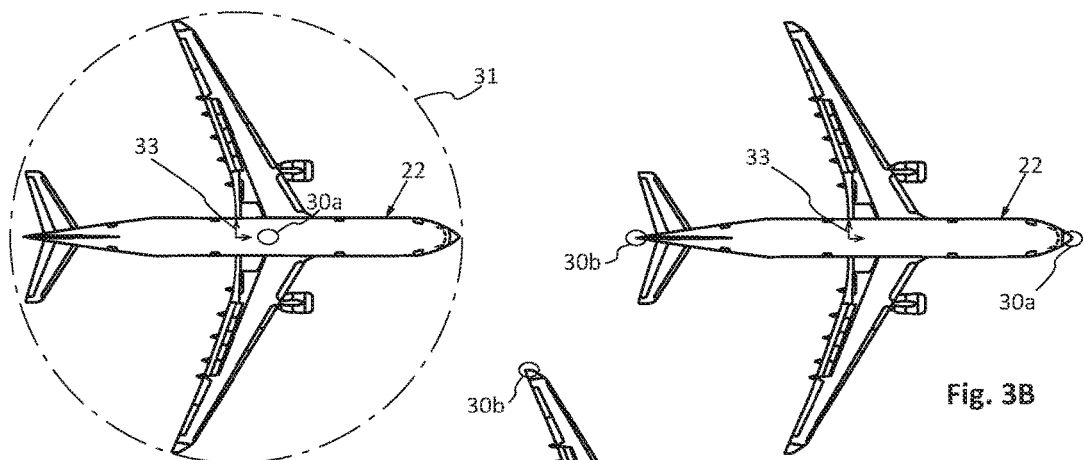
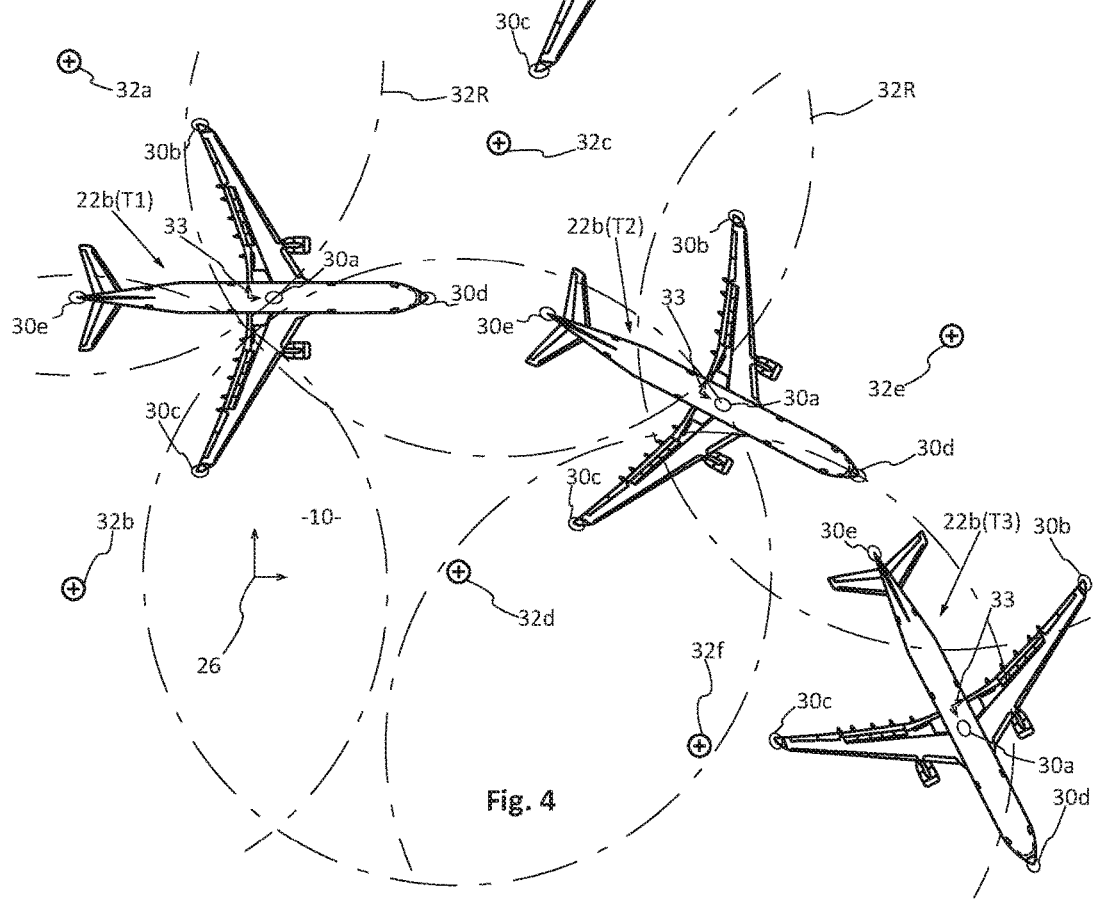

METHOD OF DETECTING COLLISIONS ON AN AIRPORT INSTALLATION AND DEVICE FOR ITS IMPLEMENTATION

CROSS-REFERENCES TO RELATED APPLICATIONS

This application claims the benefit of the French patent application No. 1561366 filed on Nov. 25, 2015, the entire disclosures of which are incorporated herein by way of reference.

BACKGROUND OF THE INVENTION

The invention pertains to a method of detecting collisions on an airport installation as well as to a device for its implementation.

To reach their parking points on an airport, aircraft travel on taxiways and come to a standstill in proximity to the airport installations. At the parking points, numerous technical vehicles move around the aircraft.

Having regard to the significant number of mobile craft on the ground (technical vehicles and aircraft) and to the proximity of the airport installations, it is necessary to implement solutions for preventing collisions between an aircraft and another aircraft, a technical vehicle or a part of an airport installation.

According to a first embodiment described for example in document U.S. Pat. No. 7,903,023, the aircraft comprises at least one onboard device for detecting collisions. This onboard device comprises several continuous millimeter wave radars, disposed on the fuselage and a system for processing and analyzing the data generated by the radar or radars.

This first embodiment is not fully satisfactory since the radars and the system for processing and analyzing the data are relatively complex to implement and are therefore expensive in terms of installation and utilization.

According to a second embodiment, the aircraft comprises an onboard device for detecting collisions which comprises several cameras and a system for analyzing the images originating from the cameras. This second embodiment is not fully satisfactory since the device is not operational when climatic conditions are bad or during the night.

As a supplement to these onboard devices, an airport air traffic control station comprises a first radar, termed the primary radar, which makes it possible to view on a control screen aircraft in flight in a monitored zone of the airport and a second radar, termed the secondary radar, which uses the signal of the transponders onboard each aircraft to refine the precision of the positioning of each aircraft in flight and on the ground.

Thus, each aircraft is represented in the form of a point associated with an identifier on the control screen. When a controller detects on the control screen a risk situation, he informs the pilot of the aircraft concerned.

This method of detecting collisions is not fully satisfactory since the controller cannot determine the template of the airplane on the basis of the point appearing on his control screen. Without this item of information, the risks of collision are difficult to characterize.

The present invention is aimed at remedying the drawbacks of the prior art.

SUMMARY OF THE INVENTION

For this purpose, a subject of the invention is a method of detecting collisions between an equipped mobile object travelling around an airport installation and at least one obstacle whose position is known in a reference frame tied to the airport installation.

The method is characterized in that it comprises the steps of:

determination of the real-time positions of the equipped mobile object in the reference frame tied to the airport installation, reading of at least one item of information contained in at least one marker fixed to the equipped mobile object and positioned in a reading field of at least one reader of a network of readers deployed over at least one zone of the airport installation, determination of an outline of the equipped mobile object on the basis of the read item of information contained in the marker, positioning of the outline determined in the reference frame tied to the airport installation, calculation of a distance between the outline of the equipped mobile object and the obstacle, triggering of an alert if the calculated distance is less than a given threshold.

The method of the invention associates with each equipped mobile object an outline allowing better appraisal of the risks of collisions.

Preferably, the outline is a circle in which the equipped mobile object is inscribed and the item of information read in the single marker fixed to the equipped mobile object makes it possible to determine the radius of the circle.

Advantageously, the method comprises the steps of:

determination of the real-time positions of at least two markers fixed to the equipped mobile object in the reference frame tied to the airport installation, reading of the items of information contained in each marker fixed to the equipped mobile object so as to determine the position of each marker in a reference frame tied to the equipped mobile object, determination of the orientation and of the real outline of the equipped mobile object.

According to a first variant, the step of determining the real-time positions of the equipped mobile object comprises determining:

the list at each instant of the markers fixed to the equipped mobile object that are present in the reading field of each reader, time-stamping items of information regarding entry and exit of each marker in the reading fields of the various readers, by triangulation, the position of each marker with respect to the readers, by change of reference frame, the position of each marker in the reference frame tied to the airport installation, the position of each reader being known in the reference frame tied to the airport installation.

According to a second variant, the step of determining the real-time positions of the equipped mobile object comprises determining:

time-stamping items of information regarding entry and exit of each marker fixed to the equipped mobile object in the reading field of a mobile reader, the real-time position of the mobile reader in the reference frame tied to the airport installation, the position of the markers with respect to the mobile reader, by a change of reference frame, the position of each marker in the reference frame tied to the airport installation.

According to a third variant, the step of determining the real-time positions of the equipped mobile object comprises determining:

the position of each marker fixed to the equipped mobile object in the reference frame tied to the equipped mobile object, the list of the markers fixed to the equipped mobile object that are present in the reading field of the readers, by triangulation, the position of each marker with respect to the readers, by a change of reference frame, the position of each marker in the reference frame tied to the airport installation, the position of the readers being known in the reference frame tied to the airport installation.

The subject of the invention is also a device for detecting collisions between an equipped mobile object travelling around an airport installation and at least one obstacle whose position is known in a reference frame tied to the airport installation.

The device for detecting collisions is characterized in that it comprises:

at least one marker fixed to the equipped mobile object comprising at least one marker identifier, a network of readers deployed over at least one zone of the airport installation, each reader having a reading field and being configured to automatically collect at least the marker identifier of each marker present in its reading field, an information processing unit comprising a piece of software configured to:

determine the position in real time of the equipped mobile object in the reference frame tied to the airport installation, determine at least one outline of the equipped mobile object, calculate a distance between the outline of the equipped mobile object and the obstacle, trigger an alert if the calculated distance is less than a given threshold.

In the case of an aircraft, each marker fixed to an equipped aircraft is configured to operate independently of an electrical power supply of the aircraft.

Preferably, an equipped aircraft comprises at least two markers remote from one another, the markers being fixed on the equipped aircraft and their positions known in a reference frame tied to the equipped aircraft.

Advantageously, an equipped aircraft comprises markers at each of the ends of the airfoil and of the fuselage of the equipped aircraft.

According to another characteristic, the device comprises a first database which catalogs each equipped mobile object and which associates, for each equipped mobile object, an identifier related to the equipped mobile object and the marker identifiers of the markers fixed on the equipped mobile object.

According to another characteristic, the device comprises a second database which catalogs obstacles of the airport installation and for each of the obstacles its outline and its position in the reference frame tied to the airport installation.

According to another characteristic, the device comprises a third database which catalogs, for each of the readers, the position of the reader in the reference frame tied to the airport installation and the reading radius of the reader.

According to another characteristic, the device comprises a system for determining a position in real time configured to determine the position of each marker in the reference frame tied to the airport installation.

Preferably, the device comprises a mobile reader associated with a means for determining the position in real time of the mobile reader in the reference frame tied to the airport installation.

BRIEF DESCRIPTION OF THE DRAWINGS

Other characteristics and advantages will emerge from the following description of the invention, which description is given solely by way of example, with regard to the appended drawings in which:

FIG. 3A is a view from above of an aircraft which illustrates a first embodiment of the invention, FIG. 3B is a view from above of an aircraft which illustrates a second embodiment of the invention, FIG. 3C is a view from above of an aircraft which illustrates a third embodiment of the invention, FIG. 4 is a view from above of an aircraft moving on an airport installation which illustrates a first variant of a device for detecting collisions according to the invention.

DETAILED DESCRIPTION OF THE PREFERRED EMBODIMENTS

Figure 1:
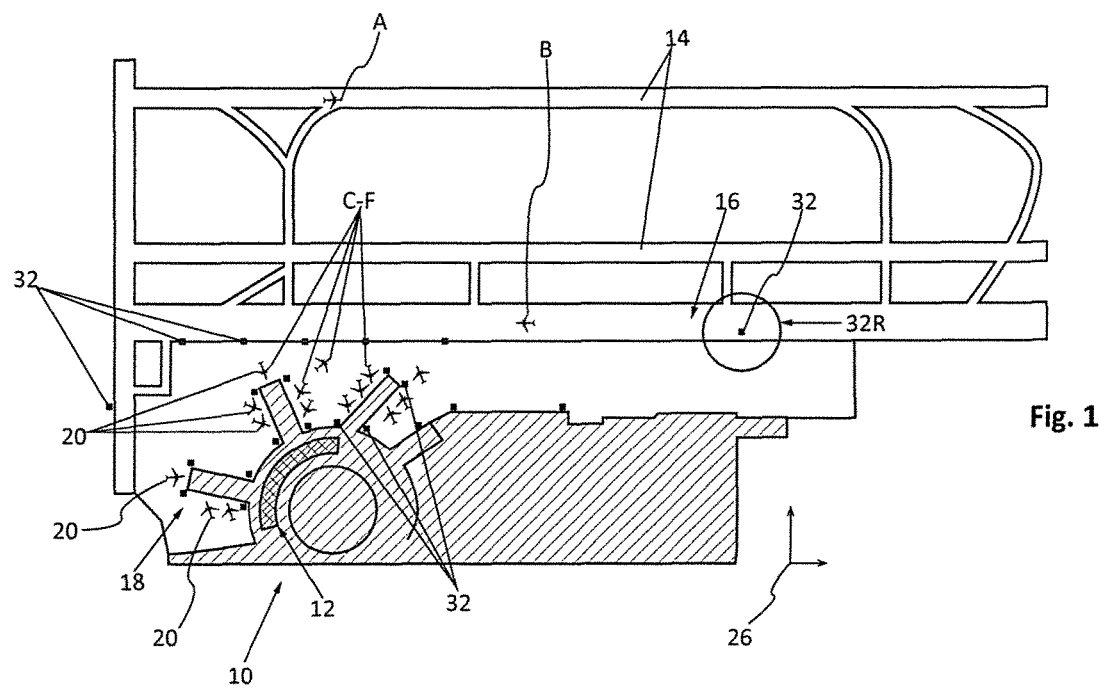
FIG. 1 is an aerial view of an airport which illustrates an embodiment of the invention.

According to one embodiment illustrated by FIG. 1, an airport installation 10 comprises at least one air terminal 12, at least one landing and/or takeoff runway 14, at least one taxiway 16 connecting each landing and/or takeoff runway 14 to at least one parking zone 18.

An air terminal 12 comprises a set of buildings and mobile parts which are attached thereto such as boarding bridges for example.

A parking zone 18 comprises at least one parking area 20 which corresponds to a location where an aircraft parks. Generally, a parking zone 18 comprises several parking points 20.

The airport installation 10 comprises a set of obstacles for an aircraft, such as, for example, a building, a mobile part attached to the building, a curbside of a taxiway or of a landing and/or takeoff runway, another aircraft.

During operation, aircraft A to F are moving or are at a standstill on the ground with respect to the elements of the airport installation 10. Represented by way of example are a first aircraft A which is landing on a landing and/or takeoff runway, a second aircraft B which is taxiing on a taxiway 16 and aircraft C to F which are at a standstill in a parking zone 18. Each aircraft A to F is identified by an aircraft registration mark containing at least one item of information, such as the serial number of the aircraft or the flight number.

In addition to the aircraft A to F, other mobile objects such as vehicles 24 are travelling on the ground. By way of example, a vehicle 24 is a fuel tender.

In a reference frame 26 associated with the airport installation 10, any mobile object (aircraft A to F or vehicle 24) occupies a given position, has a given orientation and a given speed. In the case of a stationary mobile object, the position and the orientation are fixed and the speed is zero.

In the case of a mobile object in motion on the ground, the speed is different from 0 and can vary and the position and the orientation of the aircraft vary as a function of the path followed by the aircraft.

The airport installation 10 comprises a device for detecting collisions 27.

The device for detecting collisions 27 comprises at least one marker 30 installed in or on an aircraft, this aircraft is then called an equipped aircraft 22, the position of the marker 30 being known in a reference frame 33 tied to the equipped aircraft 22.

According to a first embodiment illustrated in FIG. 3A, an equipped aircraft 22 comprises a single marker 30a whose position is known in the reference frame 33 tied to the aircraft.

According to a second embodiment illustrated in FIG. 3B, an equipped aircraft 22 comprises two markers 30a and 30b fixed on the equipped aircraft 22 and remote from one another. The markers 30a and 30b being fixed and their positions known in the reference frame 33 tied to the aircraft, these two markers make it possible to determine the orientation of the equipped aircraft 22. By way of example, the first marker 30a is positioned at the level of a nose of the equipped aircraft 22 and the second marker 30b is positioned at the level of a tail of the equipped aircraft 22.

Advantageously, the equipped aircraft 22 comprises markers 30a-30e positioned at each of the ends of the fuselage and of the airfoil of the aircraft so as to enable the outline of the equipped aircraft 22 to be determined more rapidly.

According to a third embodiment illustrated in FIG. 3C, an equipped aircraft 22 comprises five markers 30a to 30e, a first marker 30a placed under the equipped aircraft 22, at the point of intersection of the airfoil and of the fuselage of the equipped aircraft 22, a second marker 30b positioned at the end of a first wing, a third marker 30c positioned at the end of a second wing, a fourth marker 30d positioned at the level of a nose of the equipped aircraft 22 and a fifth marker 30e positioned at the level of a tail of the equipped aircraft 22.

Each marker 30 is installed by any means of fixing on the fuselage of the equipped aircraft 22. Alternatively, each marker 30 is installed in the structure of the equipped aircraft 22 and is not visible from outside the equipped aircraft 22.

Figure 6:
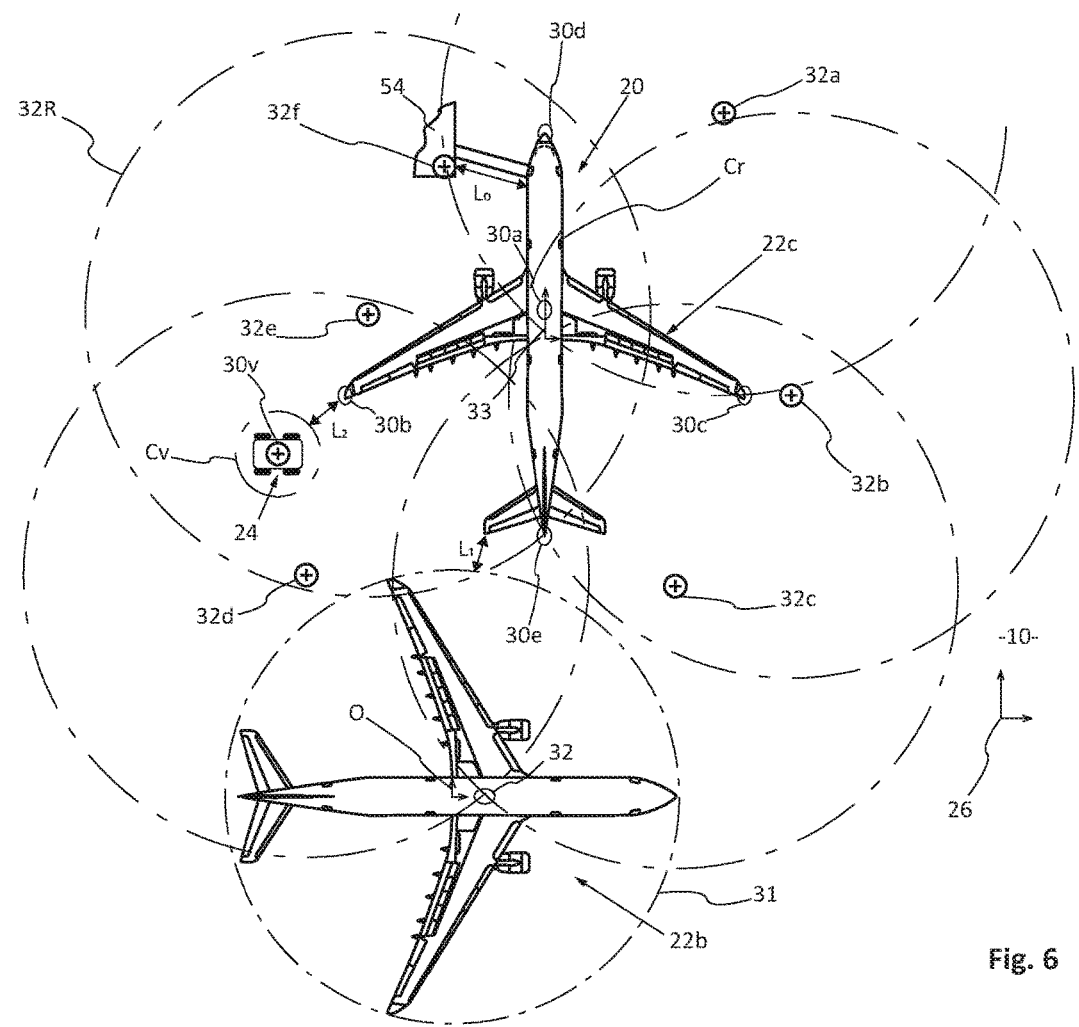
FIG. 6 is a view from above of an aircraft at a standstill in a parking area which illustrates a third variant of a device for detecting collisions according to the invention.

Preferentially, other mobile objects, such as a vehicle 24, can be equipped in the same manner as an equipped aircraft 22 and comprise at least one marker 30 (see marker 30v visible in FIG. 6).

Each marker 30 comprises at least one marker identifier which is specific to it and which is different from those of all the other markers 30. Advantageously, the marker identifier comprises an item of information relating to the aircraft registration mark.

Preferably, each marker 30 is passive. A marker 30 is termed passive if it operates by virtue of the energy provided to it by a reader. As a variant, each marker 30 comprises its own energy source and operates in an autonomous manner with respect to the equipped aircraft 22.

According to a first embodiment, each marker 30 is an RFID chip. An RFID chip comprises an antenna and an electronic chip which contains at least one item of information, in particular the marker identifier. In an automatic manner, the item of information contained in the electronic chip is transmitted to a reader when the RFID chip is positioned in a reading zone situated around the reader.

According to another embodiment, each marker 30 is a chip of NFC type. With respect to RFID chips, an NFC chip can transmit information and receive information.

Whatever the variant, each marker 30 is configured to operate independently of the electrical power supply of the equipped aircraft 22 and to communicate in an automatic manner at least the marker identifier to a reader when it is positioned in the reading field of the reader.

Advantageously, in addition to the marker identifier, each marker 30 comprises items of information relating to the outline of the equipped aircraft 22. Preferably, each marker 30 comprises items of information relating to the position of the marker 30 in the reference frame 33 tied to the equipped aircraft 22. As a variant, each marker 30 is configured to comprise, in addition to the items of information previously cited, any other item of information, such as, for example, the name of the airline, the model of airplane, the type of motorization or the dimensions (wingspan, width of fuselage, etc.) of the equipped aircraft 22.

When an equipped aircraft 22 comprises a single marker 30a, the latter can comprise in addition to the marker identifier, the position of the marker 30a in the reference frame 33 tied to the equipped aircraft 22 and the radius of the circle 31 in which the equipped aircraft 22 is inscribed. Whatever the equipped aircraft 22, the latter comprises a center which corresponds to the center of the circle 31 in which the equipped aircraft 22 is inscribed. The position of the center of the equipped aircraft 22 is known in the reference frame 33 of the equipped aircraft 22. Preferably, the origin of the reference frame 33 tied to the equipped aircraft 22 corresponds to the center of the equipped aircraft 22.

According to another characteristic of the invention, the device for detecting collisions comprises a network of readers 32 of markers, each reader 32 comprising a reading field so that each marker 30 positioned in the reading field communicates with the reader 32.

Advantageously, as illustrated in FIG. 4, the reading field of a reader 32 is a disc having as center the reader 32 and a reading radius 32R.

The network of readers 32 is deployed on at least one zone of the airport installation 10 so that at least one marker 30 of each equipped aircraft 22 present on the airport installation 10 is positioned in the reading field of at least one reader 32.

By way of example, the readers 32 are positioned at the boundary of the taxiways, on the airport's buildings, in the parking zones 18.

Advantageously, the network of readers 32 comprises at least one mobile reader 32m. By way of example, the mobile reader 32m is secured to a mobile vehicle such as, for example, an airport operations car travelling on the ground or a drone overflying the airport installation 10.

Preferably, the reader 32m is associated with a positioning means for determining its real-time position in the reference frame 26 tied to the airport installation 10. By way of example, the reader 32m is associated with a GPS sensor or a transponder.

Whatever the variant, each reader 32 is configured to communicate with each marker 30 present in its reading field so as to automatically collect at least the marker identifier of each marker 30 present in its reading field. As a variant, each reader 32 is configured to automatically collect all the items of information contained in each marker 30 present in its reading field.

Figure 2:
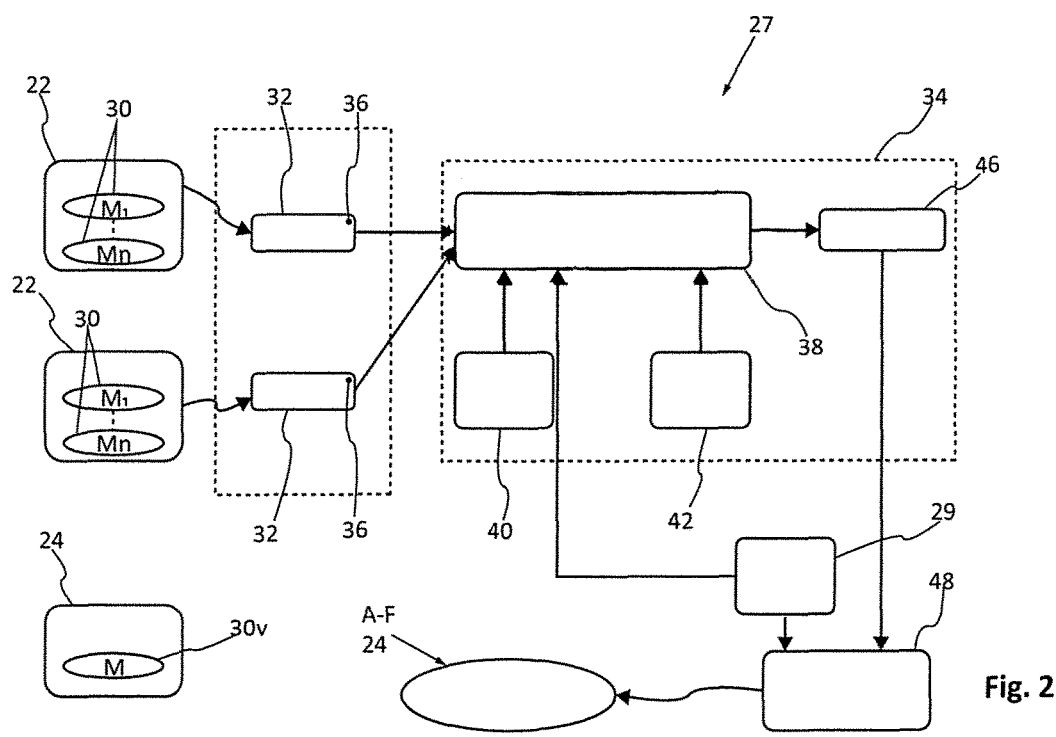
FIG. 2 is a diagram of a device for detecting obstacles which illustrates an embodiment of the invention.

According to another characteristic of the invention, as illustrated in FIG. 2, the device for detecting collisions 27 comprises a control post 34 and each marker reader 32 comprises a communication system 36 configured to exchange information with the control post 34.

This control post 34 comprises at least one first database 40 relating to the equipped aircraft 22 and at least one second database 42 relating to the airport installation 10.

For each equipped aircraft 22, the first database 40 catalogs for each equipped aircraft 22 the registration mark of the equipped aircraft 22 and the marker identifiers of the markers 30 fixed on the equipped aircraft 22. Thus, for the equipped aircraft 22 visible in FIG. 3C, the first database 40 associates with the identifier of the equipped aircraft 22 the five marker identifiers of the markers 30a to 30e fixed to the equipped aircraft 22.

According to another variant, the first database 40 associates with each aircraft registration mark items of information relating to the outline of the equipped aircraft 22, such as, for example, the radius of the circle in which the equipped aircraft 22 is inscribed, items of information relating to the markers 30 present on the equipped aircraft 22, and for each marker identifier associated with the aircraft registration mark, items of information relating to the position of the marker 30 in the reference frame tied to the equipped aircraft 22.

Thus, the items of information relating to the outline of the equipped aircraft 22 and/or the items of information relating to the position of each marker 30 in the reference frame 33 tied to the equipped aircraft 22 are contained either in each marker 30, or in the first database 40, or in both.

Advantageously, whatever the variant, the first database 40 comprises items of information relating to the equipped vehicles 24.

The second database 42 catalogs the set of obstacles of the airport installation 10 and for each of them its outline and its position in the reference frame 26 tied to the airport installation 10.

Preferably, the control post 34 comprises a third database which can be the first or second database 40 or 42 and which catalogs, for each of the readers 32 of the network, the position of the reader 32 in the reference frame 26 tied to the airport installation 10 and its reading radius 32R.

The device for detecting collisions also comprises a system for determining a position in real time 29 of each equipped aircraft 22 present on the airport installation 10.

Preferably, the system for determining a position in real time 29 is configured to determine the position of each marker 30 in the reference frame 26 tied to the airport installation 10.

According to a first variant of the device for detecting collisions, the system for determining a position in real time 29 comprises a calculation means for determining the position in real time of each marker 30 on the basis of the position of each reader 32 in the reference frame 26 tied to the airport installation 10, of the reading radius of each reader 32, of the list at each instant of the markers 30 that are present in the reading field of each reader 32 and of the time-stamping items of information regarding entry and exit of each marker 30 in the reading field of each reader 32.

With reference to FIG. 4, an equipped aircraft 22b is mobile on the airport installation 10 and successively occupies various positions in the network of readers 32, six of whose readers 32a-32f are represented here. By way of example, the equipped aircraft 22b comprises five markers 30a-30e. In FIG. 4, the equipped aircraft 22b is represented in a first position referenced 22b(T1) at an instant T1, a second position referenced 22b(T2) at an instant T2 and a third position 22b(T3) at an instant T3.

Each reader 32a-32f identifies, in real time and continuously, each marker 30a-30e present in its reading field. Moreover, for each marker 30a-30e, time-stamping items of information regarding entry and exit in the reading field of each reader 32a-32f are recorded in the readers 32a-32f.

According to a second variant of the device for detecting collisions, the system for determining a position in real time 29 comprises a calculation means for determining the position in real time of each marker 30 on the basis of the real-time position of the mobile reader 32m, of the reading radius 32R of the reader 32m and of the time-stamping items of information regarding entry and exit of each marker 30 in the reading field of the mobile reader 32m.

Figure 5:
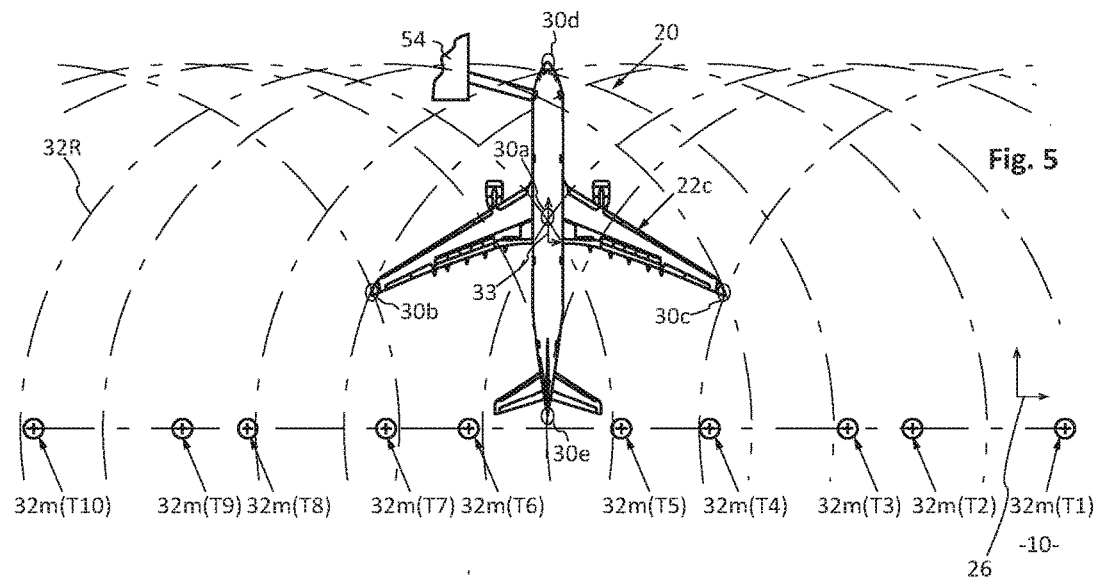
FIG. 5 is a view from above of a fixed aircraft and of a mobile reader which illustrates a second variant of a device for detecting collisions according to the invention.

With reference to FIG. 5, an equipped aircraft 22c is at a standstill in a parking area 20 of the airport installation 10 and a mobile reader 32m occupies various positions T1 to T10 in the reference frame 26 tied to the airport installation 10. By way of example, the equipped aircraft 22b comprises five markers 30a-30e. The positions T1 to T5 of the mobile reader 32m correspond to the positions of the mobile reader 32m when one of the markers 30a to 30e enters the reading field of the mobile reader 32m and the positions T6 to T10 of the mobile reader 32m correspond to the positions of the mobile reader 32m when one of the markers 30a to 30e exits the reading field of the mobile reader 32m.

According to a third variant of the device for detecting collisions, the system for determining a position in real time 29 comprises a calculation means for determining the position in real time of each marker 30a-30e on the basis of the known positions of each reader 32a-32f, of the reading radius 32R of each reader 32a-32f, of the list of the markers 30a-30e present in the reading field of each reader 32a-32f and of the position of each marker 30a-30e in the reference frame 33 tied to the equipped aircraft 22.

With reference to FIG. 6, an equipped aircraft 22c is at a standstill in a parking area 20 of the airport installation 10, several readers 32 being installed on elements of the airport installation 10 that are present in the parking area. The position of each reader 32 is known in the reference frame 26 tied to the airport installation 10. By way of example, the aircraft 22c comprises five markers 30a-30e and six readers 32a-32f are installed on elements of the airport installation 10 that are present in the parking area 20.

Each reader 32a-32f identifies the markers 30a-30e that are present in its reading field.

Thus, the reader 32a identifies the markers 30a, 30d, 30c in its reading field, the reader 32b identifies the markers 30a, 30c, 30e in its reading field, the reader 32c identifies the markers 30c, 30e in its reading field, the reader 32d identifies the markers 30b, 30e in its reading field, the reader 32e identifies the markers 30a, 30b, 30d, 30e in its reading field, the reader 32f identifies the markers 30a, 30b, 30d in its reading field.

Whatever the variant, the system for determining the position in real time 29 is configured to determine in real time the position of each equipped mobile object in the reference frame 26 tied to the airport installation 10 and to associate with this position an identifier specific to each mobile object.

Advantageously, the system for determining the position in real time 29 is configured to determine the position in real time of any mobile object on the airport installation, such as, for example, an aircraft 22 equipped with at least one marker 30, a non-equipped aircraft A to F, an airport operations car, a drone. According to one embodiment, the system for determining a position in real time 29 comprises a first radar, termed the primary radar, and/or a second radar, termed the secondary radar, the secondary radar being configured to use a signal emitted by a positioning means, such as a transponder, onboard the mobile object.

The control post 34 comprises at least one communication system 46 for transmitting the alert.

According to a first variant, the communication system 46 is configured to transmit the alert directly to the mobile object concerned, to the two mobile elements concerned in the risk of collision.

According to a second variant, the communication system 46 is configured to transmit the alert to an air traffic control station 48 which relays it to the mobile object concerned, to the two mobile elements concerned in the risk of collision.

The control post 34 also comprises an information processing unit 38 which comprises at least one piece of software configured to:

determine the position in real time of each mobile object (equipped or non-equipped aircraft/vehicle, in motion or stationary) in the reference frame 26 tied to the airport installation 10, determine at least the outline of the equipped mobile elements 22a-22f and 24 and preferably their orientation, calculate a distance between two mobile elements and between a mobile object and an obstacle of the airport installation 10, and trigger an alert if the distance determined is less than a given threshold.

Advantageously, the device for detecting collisions according to the invention is implemented in a method of detecting collisions. The method of detecting collisions can apply to any equipped mobile object travelling around the airport installation 10 on the ground, such as an equipped aircraft 22 or a vehicle 24.

Each reader 32 collects, in real time and continuously, in an automatic manner, the items of information contained in the various markers 30 present in its reading field and transmits them to the information processing unit 38 of the control post 34.

In parallel, the system for determining the position in real time 29 determines the position and the identifier of each mobile object travelling around the airport installation 10. These items of information determined in real time are transmitted to the information processing unit 38 of the control post 34.

The mobile elements not equipped with a marker are geolocated by virtue of any known positioning means such as a transponder or a GPS sensor.

The equipped mobile elements are geolocated on the basis of the position of the marker or markers 30 with which they are equipped and by using at least one of the first, second or third variants to determine the position in real time of each marker 30.

According to a first variant of the method for determining the position of the markers fixed on a mobile object, the information processing unit 38 determines the position of each marker 30 with respect to the readers 32 by triangulation, using the reading radius 32R of each reader 32, the list at each instant of the markers 30 that are present in the reading field of each reader 32 and time-stamping items of information regarding entry and exit of each marker 30 in the reading fields of the various readers 32. The position of each reader 32 being known in the reference frame 26 tied to the airport installation 10 in accordance with the second database 42, the information processing unit 38 determines by a change of reference frame the position of each marker 30 in the reference frame 26 tied to the airport installation 10.

According to a second variant of the method for determining the position of the markers fixed on a mobile element, the information processing unit 38 determines the position of the markers 30 with respect to at least one mobile reader 32m, by using the reading radius 32R of the mobile reader 32m and time-stamping items of information regarding entry and exit of each marker 30 in the reading field of the mobile reader 32m. The position of the mobile reader 32m being known in real time in the reference frame 26 tied to the airport installation 10, the information processing unit 38 determines by a change of reference frame the position of each marker 30 in the reference frame 26 tied to the airport installation 10.

According to a third variant of the method for determining the position of the markers fixed on a mobile object, the information processing unit 38 determines the position of each marker 30 with respect to the readers 32 by triangulation, using the reading radius 32R of each reader 32, of the list of the markers 30 that are present in the reading field of the readers 32 and of the position of the markers 30 in the reference frame 33 related to the mobile object. The position of each reader 32 being known in the reference frame 26 tied to the airport installation 10 in accordance with the second database 42, the information processing unit 38 determines by a change of reference frame the position of each marker 30 in the reference frame 26 tied to the airport installation 10.

Whatever the variant, for each equipped mobile object 22 or 24, knowing the position of each marker 30 in the reference frame 33 tied to the equipped mobile object 22 or 24 and the position of each marker 30 in the reference frame 26 tied to the airport installation 10, the information processing unit 38 determines the position of each equipped mobile object 22 or 24, in particular its center.

The position of the equipped mobile object 22 or 24 in the reference frame 26 tied to the airport installation 10 determined by virtue of the methods for determining the position of the markers 30 can be corroborated by the position determined with the aid of the transponder in the case of a mobile object which is moving or by the last known position determined with the aid of the transponder in the case of a mobile object that is stationary.

Knowing the position of each equipped mobile object 22 or 24 in the reference frame 26 tied to the airport installation 10, the information processing unit 38 determines the outline of each equipped mobile object 22 or 24 in the reference frame 26 tied to the airport installation 10.

For the mobile elements not equipped with a marker 30, this outline corresponds to a circle Cv in which the mobile object is inscribed.

For a mobile object equipped with a single marker 30, such as the aircraft 22b illustrated in FIG. 6, the outline of the equipped mobile object 22b corresponds to a circle 31 centered with respect to the center O of the equipped mobile object 22b. Knowing the position of the center O of the equipped mobile object 22b and the radius of the circle 31 on the basis of the information contained in the first database 40 and/or in the marker 30, the information processing unit 38 determines the position of the circle 31 in the reference frame 26 tied to the airport installation 10.

For a mobile object equipped with several markers 30, such as the aircraft 22c illustrated in FIG. 6 and equipped with markers 30a-30e, the outline of the mobile object corresponds to the real outline Cr of the equipped mobile object 22.

Knowing the position of at least two markers 30a-30e of the equipped mobile object 22c in the reference frame 26 tied to the airport installation 10 and the position of these two markers 30a-30e in the reference frame 33 tied to the mobile object on the basis of the information contained in the first database 40 and/or in the markers 30a-30e, the information processing unit 38 determines the position and the orientation of the mobile object 22c and then the position of the outline Cr in the reference frame 26 tied to the airport installation 10.

For each equipped mobile object, the information processing unit 38 determines the distance between its outline positioned in the reference frame 26 tied to the airport installation 10 and at least one neighboring obstacle whose position is known in the reference frame 26 tied to the airport installation. Generally, an obstacle can be an obstacle of the airport installation 10, another aircraft or another vehicle.

In the case of the aircraft 22c visible in FIG. 6, the information processing unit 38 determines.

the distance L0 between a building 54 whose position is known in the reference frame 26 in accordance with the second database 42 and the outline Cr of the aircraft 22c as previously determined, the distance L1 between the outline Cr of the aircraft 22c and the circle 31 of the aircraft 22b, the distance L2 between the outline Cr of the aircraft 22c and the outline Cv of the vehicle 24, Finally, if one of the calculated distances is less than a given threshold, the information processing unit 38 triggers an alert.

The device for detecting collisions makes it possible to detect all the aircraft and the vehicles, to determine their positions, to anticipate their trajectories, to determine the risks of collision and to trigger an alert in case of risks of collision.

The device makes it possible, in particular, to limit the risks of incidents at low speed on approaching the parking points or during the pushback operations.

The device for detecting collisions operates whatever the meteorological conditions.

Moreover, the device makes it possible to determine with high precision the position of each mobile object equipped with at least one marker even if the equipped mobile object is not energized.

Finally, the device for detecting collisions can be deployed at lesser cost, the markers and the readers having reduced costs.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for detecting collisions between an equipped mobile object travelling around an airport installation and at least one obstacle whose position is known in a reference frame tied to the airport installation, the method comprising the steps:

determining the real-time positions of the equipped mobile object in the reference frame tied to the airport installation, reading at least one item of information contained in at least one marker fixed to the equipped mobile object and positioned in a reading field of at least one reader of a network of readers deployed over at least one zone of the airport installation, determining an outline of the equipped mobile object on the basis of the read item of information contained in the marker, positioning the outline determined in the reference frame tied to the airport installation, calculating a distance between the outline of the equipped mobile object and the obstacle, and triggering an alert if the calculated distance is less than a given threshold.

2. The method according to claim 1, wherein the outline is a circle in which the equipped mobile object is inscribed and wherein the item of information read in the at least one marker fixed to the equipped mobile object makes it possible to determine the radius of the circle.

3. The method according to claim 1, further comprising the steps:

determining the real-time positions of at least two markers fixed to the equipped mobile object in the reference frame tied to the airport installation, reading the items of information contained in each marker fixed to the equipped mobile object so as to determine the position of each marker in a reference frame tied to the equipped mobile object, determining the orientation and the real outline of the equipped mobile object.

4. The method according to claim 1, wherein the step of determining the real-time positions of the equipped mobile object comprises determining:

the list at each instant of the markers fixed to the equipped mobile object that are present in the reading field of each reader, and time-stamping items of information regarding entry and exit of each marker in the reading fields of the various readers, by triangulation, the position of each marker with respect to the readers, by change of reference frame, the position of each marker in the reference frame tied to the airport installation, the position of each reader being known in the reference frame tied to the airport installation.

5. The method according to claim 1, wherein the step of determining the real-time positions of the equipped mobile object comprises determining:

time-stamping items of information regarding entry and exit of each marker fixed to the equipped mobile object in the reading field of a mobile reader, the real-time position of the mobile reader in the reference frame tied to the airport installation, the position of the markers with respect to the mobile reader, by a change of reference frame, the position of each marker in the reference frame tied to the airport installation.

6. The method according to claim 1, wherein the step of determining the real-time positions of the equipped mobile object comprises determining:

the position of each marker fixed to the equipped mobile object in the reference frame tied to the equipped mobile object, the list of the markers fixed to the equipped mobile object that are present in the reading field of the readers, by triangulation, the position of each marker with respect to the readers, by a change of reference frame, the position of each marker in the reference frame tied to the airport installation, the position of the readers being known in the reference frame tied to the airport installation.

7. A device for detecting collisions between an equipped mobile object travelling around an airport installation and at least one obstacle whose position is known in a reference frame tied to the airport installation, the device comprising:

at least one marker fixed to the equipped mobile object comprising at least one marker identifier, a network of readers deployed over at least one zone of the airport installation, each reader having a reading field and being configured to automatically collect at least the marker identifier of each marker present in its reading field, an information processing unit comprising a piece of software configured to:
  determine a position in real time of the equipped mobile object in the reference frame tied to the airport installation,
  determine at least one outline of the equipped mobile object,
  calculate a distance between the outline of the equipped mobile object and the obstacle, and
  trigger an alert if the calculated distance is less than a given threshold.

8. The device according to claim 7, wherein each marker fixed to an equipped aircraft is configured to operate independently of an electrical power supply of the aircraft.

9. The device according to claim 7, wherein the equipped mobile object comprises an equipped aircraft comprising at least two markers remote from one another, the markers being fixed to the equipped aircraft and their positions known in a reference frame tied to the equipped aircraft.

10. The device according to claim 9, wherein an equipped aircraft comprises markers at each of the ends of the airfoil and of the fuselage of the equipped aircraft.

11. The device according to claim 7, further comprising a first database which is configured to catalog each equipped mobile object and which associates, for each equipped mobile object, an identifier related to the equipped mobile object and the marker identifiers of the markers fixed to the equipped mobile object.

12. The device according to claim 7, further comprising a second database which is configured to catalog obstacles of the airport installation and for each of the obstacles its outline and its position in the reference frame tied to the airport installation.

13. The device according to claim 7, further comprising a third database which is configured to catalog, for each of the readers, the position of the reader in the reference frame tied to the airport installation and the reading radius of the reader.

14. The device according to claim 7, further comprising a system configured to determine a position in real time which system is configured to determine the position of each marker in the reference frame tied to the airport installation.

15. The device according to claim 14, further comprising at least one mobile reader associated with a positioning means for determining the position in real time of the mobile reader in the reference frame tied to the airport installation.

* * * * *